United States Patent [19]

Kaczeus et al.

[11] Patent Number: 4,992,899
[45] Date of Patent: Feb. 12, 1991

[54] LOW INERTIA, SINGLE COMPONENT ARM ACTUATOR FOR OPEN-LOOP TYPE DISK DRIVES

[75] Inventors: Steven L. Kaczeus; Gregory T. Kudo, both of San Jose, Calif.

[73] Assignee: Kalok Corporation, Sunnyvale, Calif.

[21] Appl. No.: 176,823

[22] Filed: Apr. 4, 1988

[51] Int. Cl.$^5$ .............................................. G11B 5/55
[52] U.S. Cl. ..................................................... 360/106
[58] Field of Search ................................. 360/104–109

[56] References Cited

U.S. PATENT DOCUMENTS

| | | | |
|---|---|---|---|
| 4,348,624 | 9/1982 | Anderson et al. | 360/106 |
| 4,366,722 | 1/1983 | Hasler | 360/106 |
| 4,456,937 | 6/1984 | Iftikar et al. | 360/106 |
| 4,722,014 | 1/1988 | Takekado | 360/106 |
| 4,796,122 | 1/1989 | Levy et al. | 360/98.01 |
| 4,829,395 | 5/1989 | Coon et al. | 360/103 |

*Primary Examiner*—Aristotelis M. Psitos
*Assistant Examiner*—David L. Robertson
*Attorney, Agent, or Firm*—Skjerven, Morrill, MacPherson, Franklin & Friel

[57] ABSTRACT

An open loop, stepper actuated disk drive, with a low inertia single component actuator arm with each low profile flexure swaged to the actuator arm at a single point, provides improved access time, shock and vibration performance, and thermal performance over prior art disk drives.

2 Claims, 6 Drawing Sheets

LOW INERTIA, SINGLE COMPONENT ARM ACTUATOR FOR OPEN-LOOP TYPE DISK DRIVES

RELATED APPLICATIONS

This applicant is related to copending and commonly filed U.S. patent application Ser. No. 07/176,903, entitled "Disk Track for Locating Zero Track and Generating Timing For Index Signal," filed by Timothy Kim, assigned to the assignee of the present invention and incorporated herein by reference.

BACKGROUND OF THE INVENTION

1. Field of the Invention

This invention relates generally to a digital computer subsystem for storing data, and more specifically to an open loop, stepper actuated hard disk drive with a low inertia single component actuator arm which positions the read/write heads/flexure assemblies that are each anchored at a single point to the actuator arm, and with a temperature compensation system for maintaining each read/write head over the centerline of the data track.

2. Description of the Prior Art

All computers regardless of size comprise the same basic subsystems: a central processing unit, a means for displaying information, a means for entering information, and a means for storing data. Several means for storing data currently exist including floppy disks, tape drives and hard or fixed disks. Floppy disks have a limited storage capacity. Tape drives are useful for archiving and backing up data, but tape drives are not appropriate for random access applications. The device most commonly used for storing large amounts of data is the hard disk drive.

The hard disk drive has a rotating medium, i.e., a disk, that can be magnetized in a certain pattern, and a floating read/write head. The read/write head creates data patterns on the rotating disk and the read/write head also reads these data patterns. In most hard disk drives several of the disks are mounted above one another, and each of the disks has a read/write head.

Figure 1A:
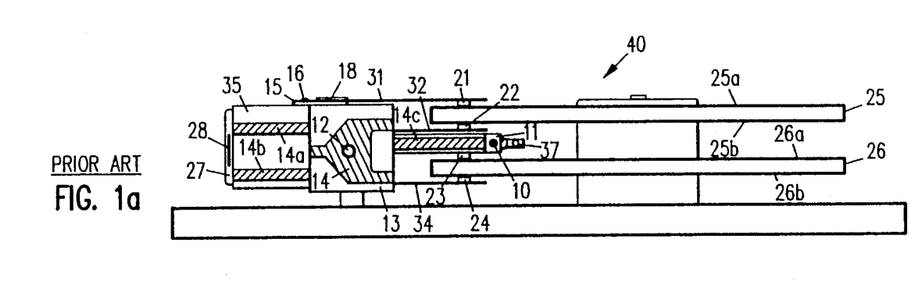
FIG. 1a and FIG. 1b, are top and side views respectively of a prior art open loop, stepper actuated hard disk drive.
Figure 1B:
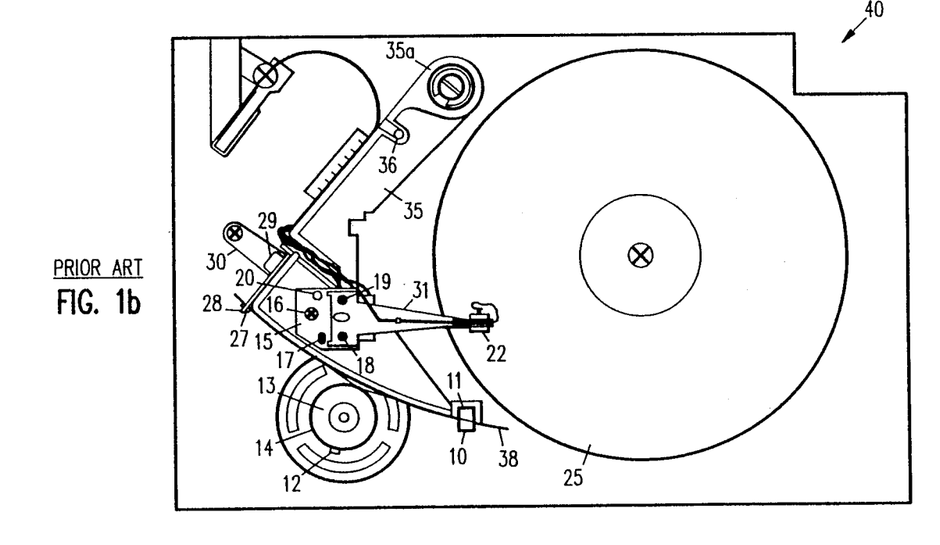

In FIGS. 1a and 1b, a prior art open loop stepper actuated hard disk drive 40 is illustrated. The disk drive 40 has two hard disks 25, 26, each of which has a magnetic recording medium on both the top surface 25a, 26a and the bottom surface 25b, 26b. An uppermost flexure 31 holds a read/write head 21 for top surface 25a of first hard disk 25 and a second flexure 32 holds a read/write head 22 for bottom surface 25b of hard disk 25. Similarly, the third flexure (not shown) holds read/write head 23 for top surface 26a of second hard disk 26, while a bottom flexure 34, the fourth flexure, holds a read/write head 24 for bottom surface 26b of hard disk 26. As used herein, a flexure means a flexible arm used to couple a read/write head to an actuator arm.

To read or write data on hard disks 25, 26, heads 21–24 must be positioned such that one of the heads is over a track on the hard disk that is to be used for data storage/retrieval. Since flexures 31–34, which hold heads 21–24, respectively, are all anchored to a single actuator arm 35, as actuator arm 35 is moved, heads 21–24 traverse the tracks on disks 25, 26 of disk drive 40. Accordingly, an electronic circuit (not shown) in disk drive 40 selects one of heads 21–24 for reading or writing in response to commands from a disk controller which interfaces disk drive 40 with a central processing unit.

Actuator arm 35 is moved by means of a stepper motor (not shown) which drives capstan 13 which in turn is coupled to aluminum actuator arm 35 by a band 14. Band 14 is made of stainless steel and has a first portion comprising two parallel strips 14a, 14b that are joined at one end by a metal rectangle 27 having a slot. The slot in rectangle 27 is placed over a tab 28. Tab 28, which is a piece of metal separate from actuator arm 35, is secured to actuator arm 35 by a screw 29. A second portion of band 14 is a single strip 14c which has two holes at an end 38 furthest from capstan 13. A clip 11, welded to strip 14c, is positioned over a hole in strip 14c closest to capstan 13 and a screw 10, which passes through clip 11 and strip 14c, secures the end of band 14 to actuator arm 35.

Parallel strips 14a, 14b of band 14 are joined to strip 14c of band 14 by a solid section in the middle of band 14 which contains a hole. The hole in the center of band 14 is force fit over a pin 12 on capstan 13. Hence, a first end of band 14 is anchored by tab 28 to actuator arm 35 and a second end of band 14 is anchored by screw 10 and clip 11 to actuator arm 35 while the middle of band 14 is wrapped around capstan 13 and attached to capstan 13 by force fitting a hole in band 14 on capstan pin 12. As the stepper motor turns capstan 13, the capstan moves band 14 which in turn moves the actuator arm 35 to which the read/write heads are attached. Accordingly, by precisely controlling the stepper motor, read/write heads 21 to 24 may be positioned over each of the tracks on disks 25, 26.

To assure proper operation of band 14, capstan 13 and actuator arm 35, band 14 is tensioned so that at the lowest operating temperature for disk drive 40 the motion of capstan 13 is uniformly transferred by band 14 to actuator arm 35. However, proper tensioning of band 14 is difficult.

Band 14 is tensioned during assembly of disk drive 40. The apparatus (FIG. 2) used to tension band 14 is difficult to use and disk drive 40 is frequently damaged during assembly. Thus, the production efficiency is directly related to the ability to tension band 14 without damaging the drive.

Figure 2:
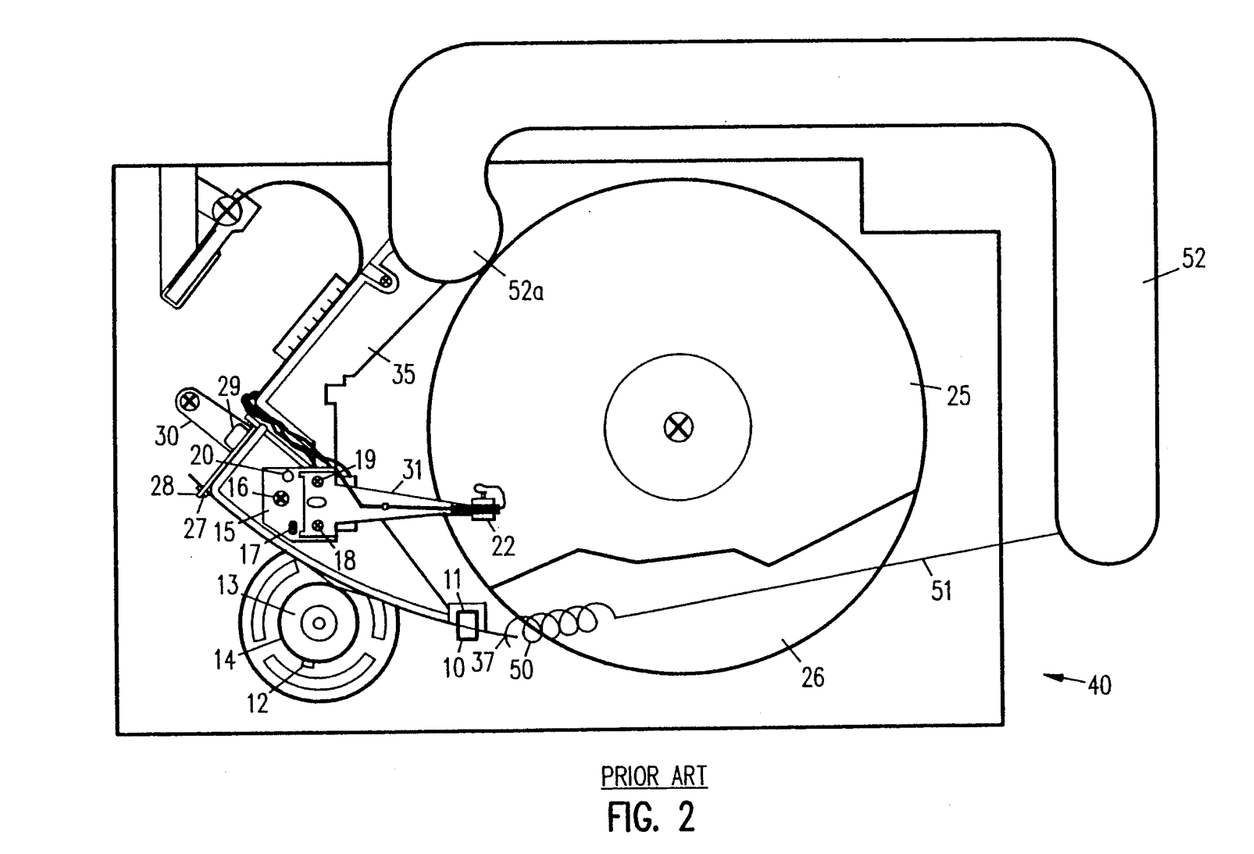
FIG. 2 illustrates prior art tensioning apparatus.

The tensioning apparatus consists of a spring 50 attached to a line 51 which in turn is attached to a body 52 of the apparatus. An end 52a of tensioning apparatus body 52 fits over end 35a (FIG. 1) of arm 35 so as to prevent movement of arm 35. To tension band 14, spring 50 is attached to hole 37 and then end 52a is placed over end 35a of arm 35. The body 52a is held so that the resulting expansion of spring 50 tensions band 14 and then screw 10 is tightened to maintain the tension. Since the tensioning apparatus passes from hole 37 between disks 25, 26 to the perimeter of drive 40 and then around the perimeter of the drive 40 to base 35a of actuator arm 35, the length of the tensioning apparatus and the close proximity of disks 25, 26 makes tensioning band 14 cumbersome. The apparatus must be held steady so that the surface of the disk 25, 26 is not contacted while affixing the tensioned band to arm 35. If the tensioning apparatus contacts the surface of either disk 25 or disk 26, the disk is very likely to be damaged.

Since hard disk drives are designed to handle large amounts of data, the hard disk drive must have the ability to rapidly access the data and provide the data to the central processing unit. There are several factors which effect the speed with which a hard disk drive accesses data. These factors include the rotational speed of the disk, the density of data storage on the disk, and the time required to position the read/write heads over the track on the disk, i.e. the access time.

For an open loop stepper actuated hard disk drive 40, such as that in FIG. 1a and FIG. 1b, the inertia of the actuator arm 35 is a significant factor in the determination of the access time, because an actuator arm having high inertia requires a longer time period to start or stop the motion of the arm for a given size of the stepper motor. For hard disk drive 40, a typical access time is 60 milliseconds.

In addition to a fast average access time, the open loop, stepper actuated disk drive, has several other performance specification requirements. These include: (a) operational linear and rotational shock and vibration specifications; (b) non-operational linear and rotational shock and vibration specifications; and (c) maintenance of the read/write head at the center line of the data track under varying temperature conditions. The operational specifications assure proper operation of the disk drive during normal use, while the non-operational specifications are intended to prevent damage to the disk drive during shipping.

The inertia of the actuator arm also affects the ability to meet the specifications for linear and rotational shock and vibration. As the inertia of the actuator arm increases, the ability to maintain the specifications decreases because once the arm is set in motion by a shock or vibration, the arm continues to move until the inertia is dissipated, and the range of motion required to dissipate the inertia for a high inertia arm is likely to be greater than the specifications.

Since a typical hard disk has 600 to 800 concentric tracks over a one-inch radius of the disk, the requirement that the open loop stepper actuated disk drive remain at the center line of the data track under different temperature conditions means that either the disk drive must be maintained in a controlled environment wherein temperature fluctuations are minimal or that the disk drive must include means for compensating for different temperature conditions. This is necessary because the components of the disk drive change size with changes in temperature. As the temperature increases, the components expand and as the temperature decreases the components contract. Hence, a change in temperature may move the read/write head off the centerline of the track. If the read/write head is not centered on the track, the data is not accurately read or written. Disk drives, which are typically used with personal computers, are not usually in a controlled environment and accordingly a means for temperature compensation such that the read/write heads remain over the center of the track for a range of temperatures is necessary.

In disk drive 40, illustrated in FIG. 1a and FIG. 1b, precise temperature compensation is limited by the method of attaching the flexure to the actuator arm. Stainless steel flexure 31 is attached to an aluminum plate 15 by two screws 18, 19. The aluminum plate 15 has two guide holes 17, 20, which fit over protrusions on aluminum actuator arm 35, and plate 15 is secured to actuator arm 35 by a screw 16. Flexure 34 is coupled to actuator arm 35 in a similar manner. The other flexures are each attached directly to the aluminum actuator arm 35 by two screws. The thickness of the portions of band 14 are selected so that the thermal expansion of band 14, capstan 13 and actuator arm 35 causes actuator arm 35 to move so as to offset the thermal expansion of aluminum plates 15, disks 25, 26 and flexures 31 to 34 so that the position of read/write heads 21 to 24 relative to disks 25, 26 tends to remain unaffected by temperature changes.

However, actuator arm 35, the aluminum plates, and the flexures expand/contract with temperature changes at different rates because each consists of a different material. Since each stainless steel flexure is anchored at two points to aluminum, the difference in thermal expansion between the flexure and aluminum may cause the flexure to buckle between the anchor points. Also, the numerous components attached to actuator arm 35 in disk drive 40 make it difficult to adequately compensate for temperature variations using a band 14 and actuator arm 35 thermal compensation system. A band and actuator arm system can offset thermal expansion for a single set of continuous boundary conditions, where a set of continuous boundary conditions correspond to the boundary conditions for a single method of affixing a flexure to the actuator arm which do not change abruptly with changes in temperature. However, each of the screws and interfaces between the various components introduce a different boundary condition and hence disk drive 40 may have several sets of boundary conditions.

The boundary conditions for the top flexure 31 and the bottom flexure 34 are different than the boundary conditions for the other two flexures because the two sets of flexures are attached differently to the actuator arm 35. As a result of the different boundary conditions, the thermal expansion of the first set of flexures, flexure 31 and 34, with a first set of boundary conditions may not be the same as the thermal expansion of the other set of flexures with a second set of boundary conditions. Accordingly, the ability to predict thermal expansion is difficult and subject to variations, and the required thermal compensation may be different for each flexure. Hence, in disk drive 40 in FIGS. 1a, 1b, the precision with which the read/write heads can be maintained over the center line of the tracks is limited by the attachment of the flexures to the actuator arm and the inability of band 14 and actuator arm 35 to effectively compensate for the different rates of thermal expansion of the various components caused by the different boundary conditions.

Also, as the temperature changes the boundary conditions may change. For example, if a flexure buckles, then the surface of the flexure is no longer in direct contact with actuator arm and hence the boundary condition changes for the temperature at which the flexure buckles. Therefore, the boundary conditions in the prior art disk drive may change abruptly with a change in temperature.

The aluminum plates, the screws used to attach the aluminum plates to the actuator arm, the screws used to attach the flexures to the aluminum plates, and the screws used to attach flexures directly to the actuator arm, increase the inertia of the assembled actuator arm. As described above, increased inertia reduces both the access time and the ability to meet linear and rotational shock and vibration specifications. Hence, the numerous plates and screws not only make thermal compensation difficult but also directly decrease the performance of the disk drive.

SUMMARY

A low inertia single component die cast actuator arm constructed in accordance with the present invention coupled with a novel method of attaching the flexures directly to the actuator arm eliminates the above-described problems of the prior art open loop, stepper actuated disk drive. The low inertia actuator arm provides an improved access time and the method of attaching the flexures to the arm coupled with the design of the band provides enhanced thermal performance.

In one embodiment of the invention, an open loop, stepper actuated disk drive comprises two hard disks, each having a magnetic medium on the top surface and the bottom surface, and an actuator assembly which controls the four read/write heads of the disk drive. The coupling of the read/write heads to the actuator arm by the stainless steel flexures is unique because each flexure is mounted flush against the actuator arm and swaged to the actuator arm. Hence, unlike the prior art flexure which was anchored at two points, the flexure of this invention is anchored at a single point to the actuator arm. Further, each of the four flexures is attached identically to the actuator arm, unlike the prior art system wherein two of the flexures were attached by a first means and the other two flexures were attached by a different means.

The actuator assembly comprises a die cast single component actuator arm having a pivot bearing assembly and a force fit band support pin. A specially designed band couples the capstan to the actuator arm. The capstan is mounted on the shaft of a stepper motor. Accordingly, as the stepper motor turns the capstan, the motion of the capstan is transferred by the band to the actuator arm and the read/write heads, which are coupled to the actuator arm, traverse the data region of the disk such that each track of the disk may be accessed.

The stiffness of the band is selected so that motion of the actuator arm caused by thermal expansion maintains the read/write heads over the centerline of the track for a broad range of temperatures. The attachment of the flexures of the present invention assures a uniform set of boundary conditions for the flexures as well as boundary conditions that do not change abruptly with temperature. Therefore, the thermal compensation is better than the prior art because the stiffness of the band compensates for expansion of each of the flexures and the elimination of buckling permits thermal compensation over a broader range of temperatures.

The single component die cast actuator arm of this assembly has only two screws, one to attach the ground line of the integrated circuit which amplifies the signals from the read/write head and selects the read/write head based upon commands from the disk controller, and another which anchors the band to the actuator arm. The prior art actuator arm assembly had thirteen screws and two additional metal plates as well as a large tab used to secure the band to end of the actuator arm. Accordingly, the inertia of the actuator arm in this invention is less than the inertia of the actuator arm of the prior art. The lower inertia results in an access time which is typically 33% better than the access time of the prior art disk drive. The low inertia actuator arm also provides enhanced vibration and shock performance over the prior art.

Further, since each of the flexures is attached to the actuator arm in the same manner, the additional plates used in the prior art system have been eliminated to further reduce the inertia of the device and provide an assembly wherein the thermal compensation required for each flexure is the same.

DETAILED DESCRIPTION OF THE INVENTION

Figure 3A:
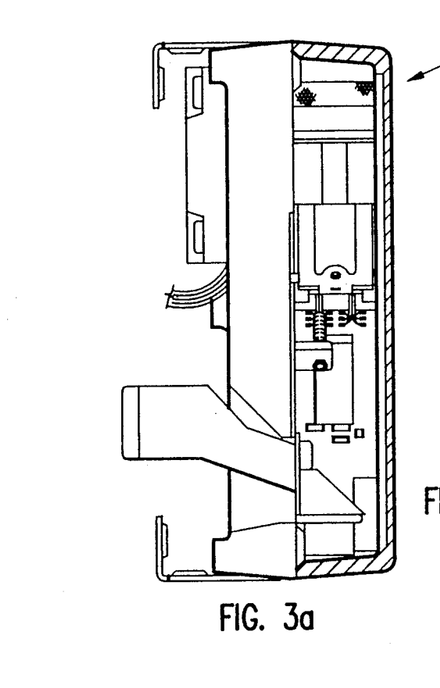
FIGS. 3a, 3b and 3c, are cut away views of the open loop, stepper actuated hard disk drive of this invention.
Figure 3B:
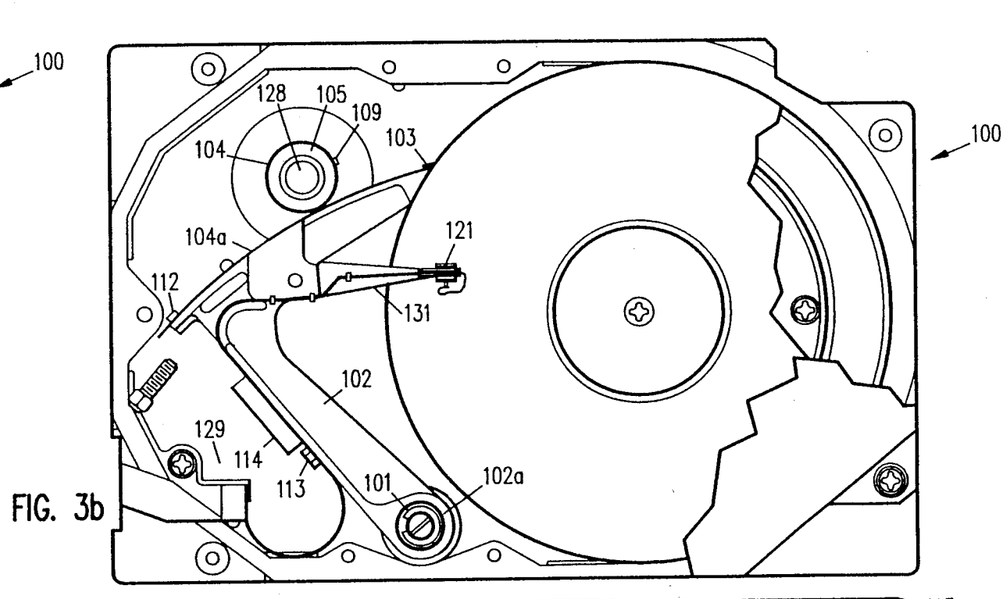
Figure 3C:
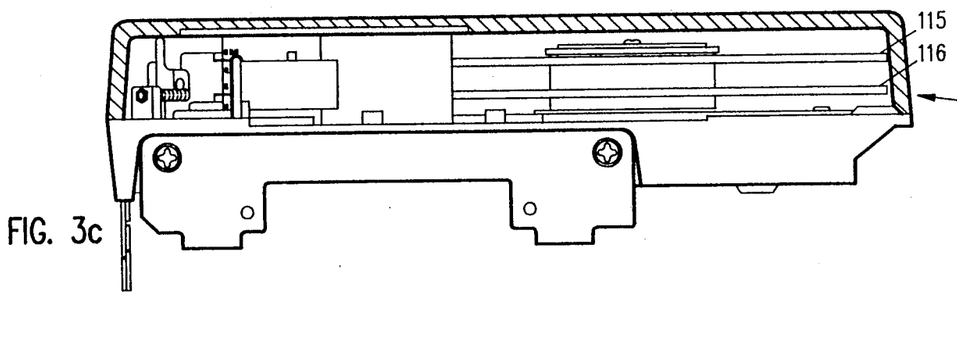

An open loop, stepper actuated disk drive 100 in accordance with this invention is illustrated in cut-away views in FIGS. 3a, 3b, and 3c. The disk drive 100 has two hard disks 115, 116 each of which have a magnetic medium on a top surface and a bottom surface. In one embodiment, hard disks 115, 116 each have a 3.5 inch diameter. Each magnetic surface of disk drive 100 has its own read/write head 121 which is coupled to a single component die cast actuator arm 102 by a flexure 131. The coupling of the read/write heads to actuator arm 102 is described in further detail below. The complete actuator assembly consists of a pivot bearing assembly 101, single component die cast actuator arm 102 and a force fit band support pin 103.

Figure 4A:
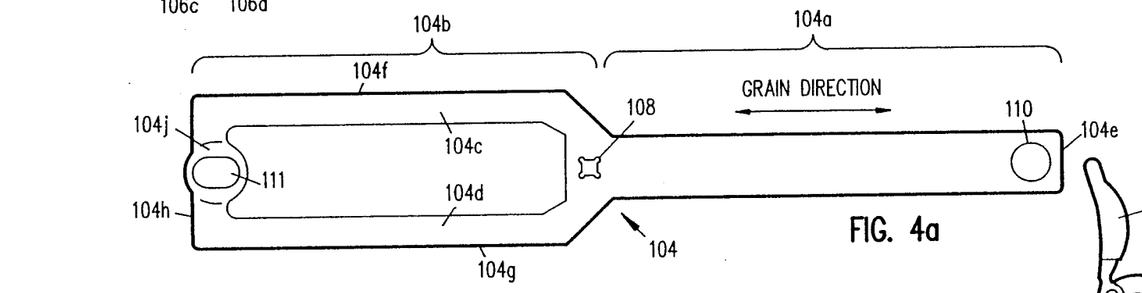
FIGS. 4a through 4e illustrate the band assembly for the open loop, stepper actuated hard disk drive of this invention.
Figure 4B:
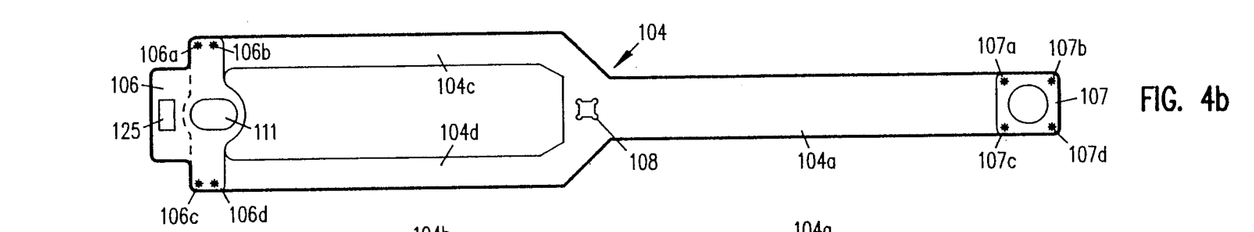
Figure 4C:
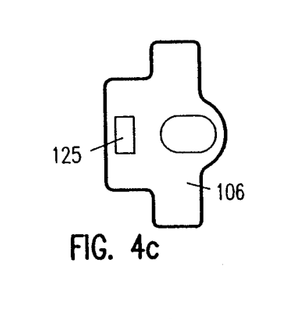
Figure 4D:
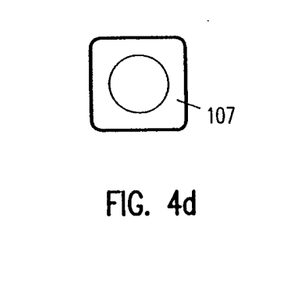
Figure 4E:
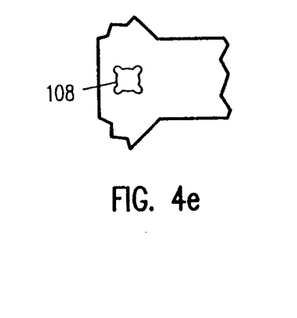

A band 104, used to couple actuator arm 102 to a capstan 105 and the related components are shown in FIG. 4a through FIG. 4e. Band 104 may be formed from any corrosion resistant steel. In a preferred embodiment, band 104 was formed from 0.0015±0.00015 inch thick cold rolled Sandvik 11R51 with a 299,000 psi minimum tensile strength. In this embodiment, a pull plate 106 in FIG. 4c and a hook plate 107 in FIG. 4d are comprised of 0.010±0.001 inch thick cold rolled Sandvik 11R51 and are welded to band 104 as described below. As shown in FIGS. 4a and 4e, the band 104 has a cloverleaf hole 108 designed to facilitate assembly of band 104 on capstan 105 (FIG. 3b). The cloverleaves deflect a certain amount when cloverleaf hole 108 is force fit over a capstan pin 109.

The centerline of hole 108 divides the band 104 into two portions. The first portion is a strip 104a which has a length of 1.908 inches and a width of 0.140 inches. Strip 104a is primarily rectangular except that at a distance of 0.09 inches from the center of cloverleaf hole 108, strip 104a flares out at a 45° angle to join two rectangular strips 104c, 104d which form the second portion 104b of band 104. The length of strip 104a from the end 104e farthest from cloverleaf hole 108 to the start of the flare is 1.818 inches. A 0.09 inch diameter hole 110 has a center at 0.090 inches from end 104e of strip 104a.

Second strip 104b of band 104 is 1.694 inches in length and consists of two parallel strips 104c, 104d whose outside edges 104f, 104g are 0.550 inches apart. Strip 104c and strip 104d are each 0.120 inches wide. The end 104h of strip 104b opposite the cloverleaf hole 108 comprises a strip 104j which joins strips 104c and 104d. Strip 104j is initially 0.125 inches wide at both ends, but strip 104j enlarges between strips 104c, 104d such that the boundary of strip 104j is defined by a circle with a radius of 0.10 inches. A slot 111, 0.145 inch by 0.95 inch, is centered within the enlarged portion of strip 104j.

The pull plate 106 is resistance spot welded to band 104 at the points 106a, 106b, 106c, 106d, as shown in FIG. 4b, so that the welds withstand a minimum shear force of 7.0 lbs. Similarly, hook plate 107 is resistance spot welded to band 104 at the points 107a, 107b, 107c, 107d, as shown in FIG. 4b, so that the welds withstand a minimum shear force of 7.0 lbs. No part of band 104 protrudes into the hole of pull plate 106 and no burrs, nicks, pits, creases or kinks are visible in band 104 at a 10× magnification. The band is finished such that it has a root mean square surface roughness of 10 microinches.

The smoothness of the band is an important aspect of the invention. If the band has a nick, burr or scratch, the defect creates a stress concentration which results in a premature failure of the band. Electropolishing, a technique known to one skilled in the art, is used to achieve the specified smoothness of the band. The dimensions of the band are selected by a method described below so that the read/write head remains at the center line of the data tracks under different temperature conditions.

Band 104 is connected to capstan 105 by a press fit of the cloverleaf hole 108 on capstan pin 109 and one end 104h of band 104 is placed over the band support pin 103 in actuator arm 102, while the other end 104e is secured by screw 112 to actuator arm 102 (FIG. 3b). Thus, as in the prior art disk drive 40 in FIG. 1a and FIG. 1b, disk drive 100, illustrated in FIGS. 3a, 3b, and 3c, of this invention positions the read/write heads over the desired track by using a stepper motor (not shown) to turn capstan 105, which is mounted on shaft 128 of the stepper motor, and as capstan 105 turns, the motion is transferred by band 104 to actuator arm 102 to which the read/write heads are coupled. Control of the motion of capstan 105 through the stepper motor provides a means to position the read/write heads over any desired track on disks 115, 116. Also, as explained below, as arm 102 expands or contracts with temperature variations, band 104 is stressed and since the band is anchored to the capstan 105, the thermal expansion of arm 102 causes arm 102 to move such that the read/write heads remain positioned correctly. The specific design of the band and the thermal compensation achieved are described also in more detail below.

As in the prior art disk drive 40, shown in FIGS. 1a and 1b, band 104 of this invention is tensioned so that at the lowest operating temperature for disk drive 100 in FIG. 3b the motion of capstan 105 is uniformly transferred by band 104 to actuator arm 102. However, unlike the prior art band, the point of attachment for the tensioning mechanism is a rectangular slot 125 in pull plate 106 in FIGS. 4b and 4c. When band 104 is attached to actuator arm 102 as described above, slot 125 is located on the end of actuator arm most remote from disks 115, 116 and not the end of the actuator arm closest to the disks as in the prior art disk drive.

Figure 5:
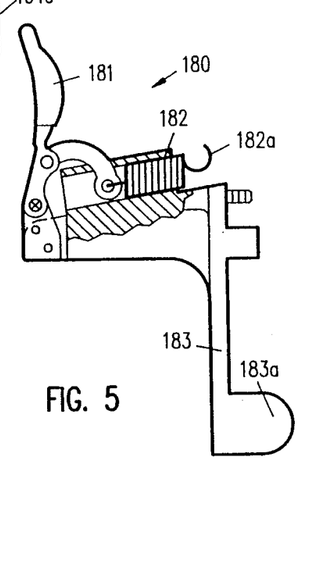
FIG. 5 illustrates tensioning apparatus used with a disk drive in accordance with the invention.

The tensioning mechanism 180 (FIG. 5) is attached to slot 125 by end 182a of spring 182. An end 183a of a tensioning mechanism body 183 fits over the base 102a (FIG. 3) of actuator arm 102. Tensioning mechanism 180 does not extend between the disks 115, 116. Further, tensioning mechanism 180 is smaller and more easily handled because of the close proximity of slot 125 to the base 102a of actuator arm 102. To tension band 104, an arm 181 (FIG. 5) is moved so that spring 182 exerts about 4 to 5 pounds of tension on band 104. The tension is applied and then released several times to exercise band 104 so that band 104 fits uniformly around capstan 105 and arm 102. After band 104 is exercised, the tension is applied and screw 112 is tightened.

The design of band 104 facilitates construction of the disk drive by eliminating the cumbersome tensioning mechanism of the prior art and also increases productivity in manufacture of the disk drive by minimizing the potential for damage to the disks during the tensioning process.

Figures 6A, 6B, 6C, 6D:
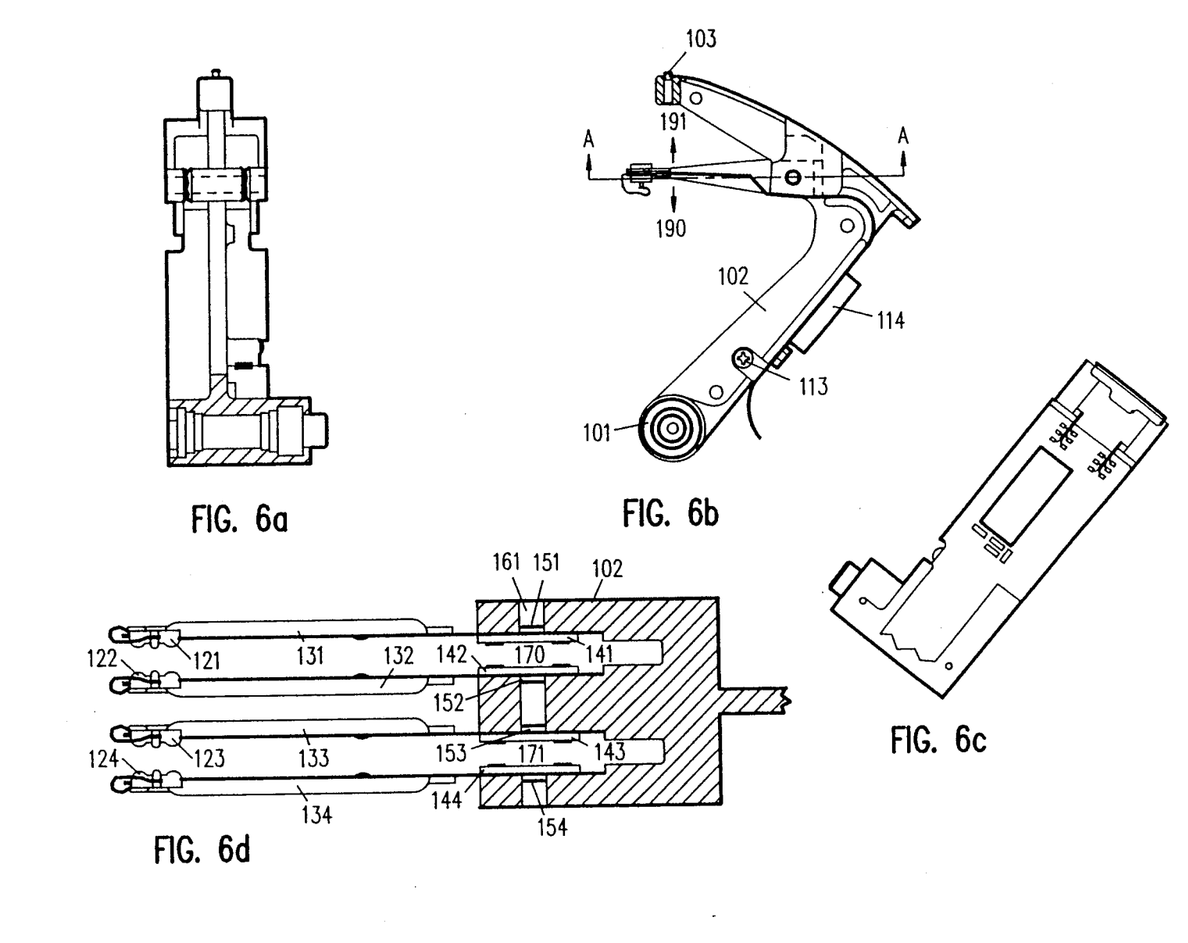
FIGS. 6a through 6d illustrate the die cast single component actuator arm and flexure assembly of this invention.

Another unique feature of this invention is the four low profile head/flexure assemblies which are swaged onto actuator arm 102 as shown in FIGS. 6a, 6b and 6d. As shown in Section AA in FIG. 6d, the four read/write heads 121, 122, 123, 124 are attached to flexures 131, 132, 133, 134, respectively, to form four head/flexure assemblies. Each of flexures 131, 132, 133, 134 (typically stainless steel) is welded to stainless steel plates 141, 142, 143, 144, respectively. Plates 141 to 144 have annular lips 151 to 154, respectively, which protrude through a hole in the flexure. Each flexure-plate assembly is seated on actuator arm 102 so that the flexure is flush against the surface of actuator arm 102 and the annular lip of the plate protrudes into a hole in actuator arm 102. (See FIG. 6d). Each flexure is then swaged to die cast aluminum actuator arm 102.

To swage the flexure-plate assembly to actuator arm 102 a hard metal ball, such as a ball-bearing, with a diameter slightly greater than the inner diameter of annular lip 151 is placed in hole 161, and precisely machined spacers (not shown) are placed in slots 170 and 171 to hold the flexure-plate assemblies in actuator arm 102 during swaging. In one embodiment, a lubricant is sprayed in the annular lip region of each flexure-plate assembly to facilitate the swaging process. However, if a lubricant is used, the lubricant must be selected so that when the actuator arm is assembled in disk drive 50 and the lubricant migrates onto the surface of the disk, the read/write heads do not stick to the disk. Accordingly, in the preferred embodiment, a disk lubricant, such as perfluoroalkylpolyether which is sold under the name KRYTOX by Dupont, was used as the lubricant.

To actually swage the flexures to actuator arm 102, the hard metal ball is forced through the annular lip of each plate by a machine which has a metal pin that applies pressure to the ball. As the ball passes through the lip, the lip is expanded and forced into the metal of actuator arm 102. The flexures are affixed to arm 102 such that they will not break lose from arm 102 when a torque of 0.2544 inch-lbs. is applied to the head/flexure assembly in the directions as shown by arrows 190, 191 in FIG. 6b.

The unique low profile design of the head/flexure assembly of this invention not only achieves a more compact disk stack design but also effectively reduces the off-track error of the read/write heads caused by random disk flutter. Since disk flutter is random and cannot be completely eliminated, the disk drive should minimize the effect of flutter. To achieve the optimal minimization of the effect of flutter, the vertical distance from the top of the disk to the point where the flexure is attached to the actuator arm would be zero, because in this configuration the variation in the positioning of the read/write head, i.e. the off-track error, is only the effective lateral motion of the disk caused by flutter. However, a disk drive with multiple disks, each disk having two usable surfaces cannot be built with the vertical distance as zero. Thus the vertical distance must be increased.

Since the length of the flexure arm is constant, as the vertical distance increases, disk flutter causes the lateral position of the read/write head to move relative to the disk tracks and the off-track error increases. Therefore, the selection of the vertical distance from the top of the disk to the point where the flexure is attached to the actuator arm is a trade-off between ease of manufacture and the anticipated amount of flutter. A large anticipated flutter would justify the increased difficulty of manufacture required by a small vertical distance because the small vertical distance minimizes the effect of the anticipated flutter. In one embodiment of the invention, the vertical distance using the principles of the present invention is greater than 0.0 inches but less than 0.060 inches.

To better illustrate the advantage of the low profile design of the head/flexure assembly of this invention, the off-track error for an embodiment having a vertical height of 0.040 inches is compared with that of the prior art. In the prior art high profile head/flexure assembly, the vertical distance L1 (see FIG. 7) from the surface of the disk to the bottom 302 of the mounting surface of flexure 303 was typically 0.100 inches, while the straight line distance L2 from the edge 304 of the actuator arm to the centerline of the read/write head 301 was 0.935 inches and so the horizontal distance L3 was 0.9296370 inches.

Assume disk flutter caused distance L1 to increase to a distance L1' (FIG. 7), where L1' equals 0.102 inches. Since the length of flexure 303 is fixed, i.e., distance L2 is fixed, when distance L1 increases to distance L1', the distance L3 decreases to L3'. Thus, increasing L1, 0.100 inches, to L1', 0.102 inches, causes the horizontal distance L3 to decrease to L3' which is 0.9294197 inches as shown by the dotted line in FIG. 7. Thus, a 0.002 inch disk flutter caused an off-track error of 217 microinches.

Figure 7:
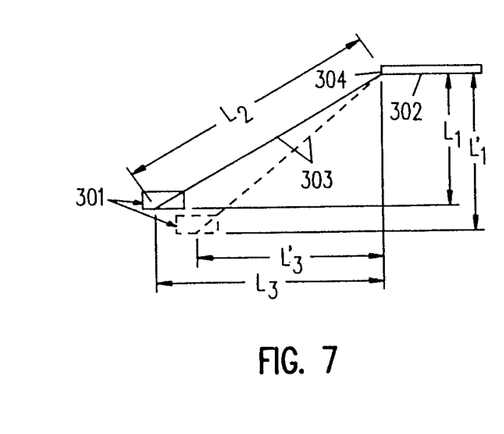
FIG. 7 is a diagram used to calculate the relationship between the profile of a flexure and the off track error.

In the low profile design of the head/flexure assembly of one embodiment of this invention, the distance L2 is still 0.935 inches, but the vertical distance L1 is reduced to 0.040 inches which gives a horizontal distance L3 of 0.9341439 inches. With the low profile design, a 0.002 inch disk flutter, i.e. L1' equals 0.042 inches, reduces the distance L3 from 0.934139 to distance L3' of 0.9340562 inches. Hence, a 0.002 inch disk flutter for the low profile head/flexure assembly generates only a 88 microinch off-track error. The head/flexure assembly of this invention compensates for the random variations in the movement of the disks in disk drive 100 by minimizing the effect of such variations compared to the prior art disk drives.

The single die cast actuator arm 102 and swaged flexures eliminate many components used in the prior art so that the inertia of the assembled arm is smaller than that of the prior art arm. The access time, as well as the shock and vibration performance, of disk drive 100 of this invention are enhanced over the prior art by the lower inertia of the assembled arm. While the prior art disk drive 40, shown in FIGS. 1a and 1b, had an average access time of 60 milliseconds, the lower inertia arm of the disk drive 100 in FIG. 3b is selected to provide an average access time of about 30 milliseconds to 50 milliseconds. In the preferred embodiment, the lower inertia arm gave an average access time of 40 milliseconds. Accordingly, elimination of the prior art method for attaching the flexures to the actuator arm and the band to the actuator arm increases the performance of the disk drive by 33%.

The disk drive of this invention has improved temperature compensation over the prior art, as is described below, because there are fewer parts and consequently, fewer interfaces between the parts. The reduction in the number of parts and the interfaces between the parts facilitates the design of the thermal compensation system which keeps the read/write head centered over the centerline of the data track on the disk, because a simple model can be used to initially bound the parameters for the thermal compensation system. Since the simple model is a reasonable approximation of the actual system, the experimental effort required to completely define the parameters for the thermal compensation system is less than that for the prior art systems. Accordingly, the die cast actuator arm and head/flexure assemblies of this invention both simplify and reduce start-up production costs.

The thermal response of the single component aluminum actuator arm 102 in FIG. 6b, band 104 in FIG. 4b, and stainless steel flexures 131, 132, 133, 134, in FIG. 6d, is more easily modeled than the prior art structure in FIGS. 1a and 1b because the number of boundary conditions are minimized. The assembly in FIGS. 1a and 1b, as described previously, consists of three or more materials that are held together with screws. Each flexure in the prior art assembly is anchored with two screws and hence the flexure may buckle in response to a temperature variation. To accurately predict the temperature response of the prior art assembly, the thermal characteristics of each of the material interfaces and the perturbations introduced by the screws and/or buckling of the flexures must be considered.

As shown in FIG. 6d, each stainless steel flexure is swaged to the aluminum actuator arm at a single point. Hence, the problem of buckling has been eliminated, and the interface between the flexure and the actuator arm remains smooth with variations in temperature.

The thermal compensation system of this invention works as follows. As the temperature increases, the actuator arm 102 and the flexures 131, 132, 133, 134 expand and the expansion displaces the read/write head. Also, disks 115, 116 in FIG. 3c and a platform 129 of disk drive 100 expand with an increase in temperature. Since platform 129 (typically aluminum) supports the stepper motor on which capstan 105 is mounted, the spindle motor on which disks 115, 116 are mounted, and actuator arm 102 through pivot bearing assembly 101, thermal expansion of platform 129 causes the relative position between disks 115, 116, capstan 105 and actuator arm 102 to change. The net displacement of the read/write heads relative to a track on the disk, i.e., the movement of the read/write heads generated by the thermal expansion of the disks, the flexures, and platform 129 (FIG. 3b), is the distance C. Here, the effect of an increase in temperature is considered, but the analysis for a decrease in temperature is similar.

As previously described, band 104 in FIG. 3b is anchored to actuator arm 102 and capstan 105. As the temperature increases, band 104, actuator arm 102, and capstan 105 also expand. The band 104 is designed, as described below, so that the difference in the thermal expansion between band 104, the capstan 105, and actuator arm 102 causes actuator arm 102 to move a distance —C. Thus, the thermal expansion of the various components is offset and so the read/write head remains centered over the track of interest on the disk. To achieve this compensation, the parameters for band 104 are selected so that stiffness of the band coupled with the thermal expansion of the other components results in the displacement described. Here, the displacement C is considered as an instantaneous adjustment that is not a function of time.

Figure 8:
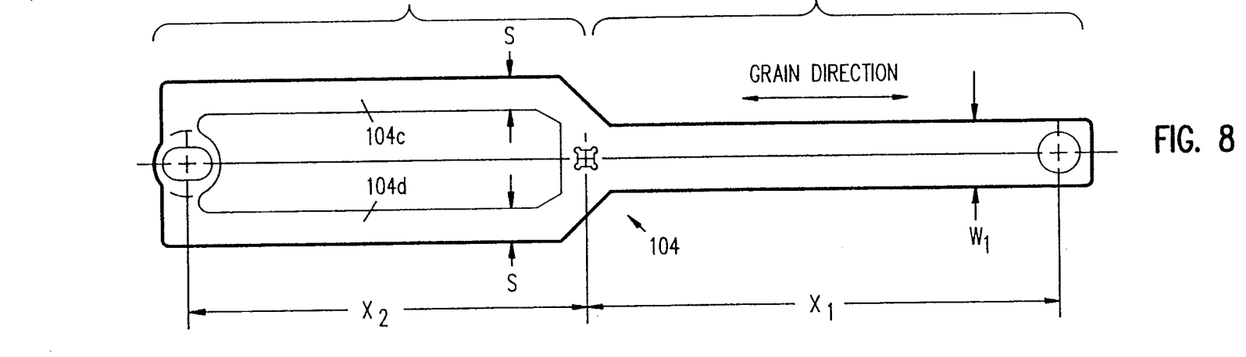
FIG. 8 is an illustration of the dimensions of the band assembly.

In FIG. 8, strip 104a of band 104 has a width $w_1$ and a length $x_1$ and strip 104c and 104d each have a width s and a length $x_2$. Thus, the effective width of portion 104b is 2s or $w_2$ and the length of portion 104b is $x_2$. The problem is to select the dimensions $x_1$, $x_2$, $w_1$, $w_2$ of band 104 so that the the stiffness and thermal expansion of the band, the thermal expansion of the actuator arm and capstan offset the effect of the expansion of the flexure, the platform and the disk. To initially bound the dimensions of the band, the dimensions $x_1$, $x_2$ and $w_2$ are selected and then the dimension $w_1$ is determined in the following manner.

Figure 9:
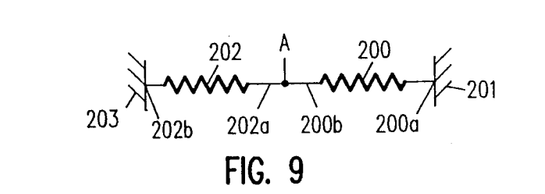
FIG. 9 is a one dimensional model of the actuator arm band assembly.

Band 104 is modeled as two springs (see FIG. 9) wherein a first end 200a of a first spring 200 is anchored to structure 201 and a second end 200b of spring 200 is connected to the first end 202a of spring 202 at the point A. The second end 202b of spring 202 is anchored to structure 203. Structure 201 in FIG. 9 represents the point at which screw 112 in FIG. 3b anchors strip 104a of band 104 to the actuator arm 102 and first spring 200 represents strip 104a of band 104. Structure 203 in FIG. 9 represents the band support pin 103 in actuator arm 102 in FIG. 3b, and spring 202 represents second portion 104b of band 104. The point A at which springs 200, 202 are joined in FIG. 9 represents capstan pin 109.

Figure 10:
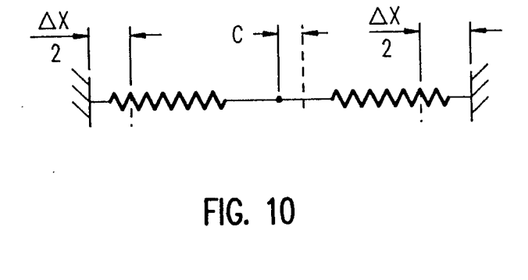
FIG. 10 illustrates the response of the one dimensional model to an increase in temperature.

As the temperatures increases, actuator arm 102 expands and thus, the anchor points 201, 203 move further apart as shown in FIG. 10. If the total expansion per degree Fahrenheit is $\Delta x$, then each anchor point moves a distance $\Delta x/2$. The movement of the junction A of springs 200, 202 is determined by the relative spring stiffness constants $k_1$, $k_2$, respectively, of the springs 200, 202. Band 104 is formed so that the combined effect of thermal expansion and the band stiffness is such that the junction is displaced a distance C. The stiffness constant of the aluminum actuator arm is taken as a very large number, i.e. infinity.

The total expansion per degree Fahrenheit $\Delta x$ comprises the expansion of spring 200, $\Delta x_1$, and the expansion of spring 202, $\Delta x_2$ so that $$\Delta x = \Delta x_1 + \Delta x_2, \tag{1}$$

but the displacement of a spring when one end of the spring is anchored and a force F is applied at the other end of the spring is $$\Delta x_1 = F/k_1, \Delta x_2 = F/k_2. \tag{2}$$

Substituting equation (2) into equation (1) and simplifying gives $$F = \frac{\Delta x \, k_1 \, k_2}{k_1 + k_2} \tag{3}$$

From FIG. 10, the displacement $\Delta x_1$ can be represented as $$\Delta x_1 = \Delta x/2 + C \tag{4}$$

and the displacement $\Delta x_2$ can be represented as $$\Delta x_2 = \Delta x/2 - C$$

or $$\Delta x/2 = \Delta x_2 + C. \tag{5}$$

Substituting equation (5) into equation (4) gives $$\Delta x_1 = \Delta x_2 + 2C$$

or $$C = \frac{\Delta x_1 - \Delta x_2}{2}. \tag{6}$$

Then, substituting equation (2) into equation (6) and simplifying gives $$C = F \frac{k_2 - k_1}{2 k_1 k_2} \tag{7}$$

Thus, the thermal displacement C is expressed in terms of the force F and the spring stiffness constants $k_1$, $k_2$, but the force F is not known. Accordingly, equation (3) is substituted into equation (7) to eliminate the force F which gives $$\frac{k_2}{k_1} = \frac{\Delta x + 2C}{\Delta x - 2C} \tag{8}$$

This equation gives the ratio of the spring constants in terms of the total thermal expansion of the actuator arm assembly $\Delta x$ and the net thermal expansion C between the disk and the flexure/actuator arm combination, both of which can be calculated, but to determine the width $w_1$ of band 104, the spring constants must be eliminated from equation (8).

To eliminate the constants $k_2$, $k_1$ from equation (8), Hooke's law is used. Hooke's law is $$\sigma = \epsilon E \tag{9}$$

where
 $\sigma$ = stress = $F_1/A$
 $\epsilon$ = unit elongation = $\Delta x/x$
 $E$ = Young's modulus
 $F_1$ = force
 $A$ = cross sectional area = wt
 $\Delta x$ = elongation per degree Fahrenheit
 $x$ = length
 $w$ = width
 $t$ = thickness or $$\frac{F_1}{A} = \frac{\Delta x}{x} E \tag{10}$$

-continued $$F_1 = \frac{A\Delta x}{x} E \quad (11)$$

but as in equation (2)

$$F_1 = k\Delta x \quad (12)$$

so that $$k = \frac{wt}{x} E \quad (13)$$

or for spring constants $k_1$, $k_2$ $$k_1 = \frac{w_1 t}{x_1} E \text{ and} \quad (14)$$

$$k_2 = \frac{w_2 t}{x_2} E \quad (15)$$

where, as shown in FIG. 8,
 $w_1$ = width of strip 104a
 $x_1$ = length of strip 104a
 $w_2$ = width of portion 104b = 2s
 s = width of strip 104c and width of strip 104d
 $x_2$ = length of portion 104b.
Dividing equation (15) by equation (14) gives $$\frac{k_2}{k_1} = \frac{w_2 x_1}{w_1 x_2} \quad (16)$$

Combining equation (8) and equation (16) to eliminate the spring stiffness constants $k_2$, $k_1$ and solving for $w_1$ gives $$w_1 = \frac{w_2 x_1 (\Delta x - 2C)}{x_2 (\Delta x + 2C)} \quad (17)$$

Thus, since $\Delta x$ and C can be calculated, equation (17) shows that if three of the four dimensions of band 104 are selected, the fourth is determined such that displacement of the read/write head caused by expansion of actuator arm 102 and band 104 is equivalent to the thermal expansion of platform 129, the flexure and the disk so that the read/write head remains stationary over the centerline of the track.

The single component actuator arm of this invention and the uniformity of the interface between the flexures and the actuator arm make the one-dimensional analysis of the thermal response of the disk drive feasible. As shown in FIG. 6d, each of the four flexures is attached identically to the actuator arm, i.e., swaged to the actuator arm at a single point. However, in prior art disk drive 40 in FIG. 1a, described previously, the screws and plates used to couple flexures 31, 34 to the actuator arm introduce multi-dimensional perturbations so that the one-dimensional analysis is not appropriate. Also, in FIG. 1a, flexures 31 and 34 are attached to the actuator arm in one manner and the other flexures are attached to the actuator arm in another manner. Consequently, the boundary conditions for the prior art flexures are different and this may result in different thermal expansions of the flexures for the same temperature variation. Accordingly, even if the above method were used to design a band which compensated for the thermal expansion of the top flexure and the bottom flexure in FIG. 1, the thermal compensation provided by the band would not be correct for the middle flexures. Since the present invention eliminates the variation in the boundary conditions and the multi-dimensional perturbations, the above method is appropriate for each of the flexures in this invention.

To determine the width $w_1$ of strip 104a with equation (17), the other dimensions of band 104 must be specified and the distance C and the expansion $\Delta x$ calculated. The expansion per degree Fahrenheit $\Delta x$ consists of two components: (1) the expansion of the capstan and the portion of the band around the capstan; and (2) the expansion of the actuator arm and the remaining portion of the band. The expansion, $\Delta x$, is given by:

$$\Delta x = (\alpha_c - \alpha_b)\pi d + (\alpha_a - \alpha_b)(x_1 + x_2 - \pi d)$$

where
 $x_1$ = length of member 104a
 $x_2$ = length of member 104b
 d = diameter of capstan
 $\alpha_c$ = coefficient of thermal expansion of capstan
 $\alpha_b$ = coefficient of thermal expansion of band
 $\alpha_a$ = coefficient of thermal expansion of actuator arm.
Similarly, the displacement C, caused by the difference in thermal expansion of the flexure, the platform and the disk is given by $$C = (\alpha_d - \alpha_f)x_f - (\alpha_d - \alpha_p)x_c$$

where
 $\alpha_f$ = coefficient of thermal expansion of the flexure
 $\alpha_d$ = coefficient of thermal expansion of the disk
 $\alpha_p$ = coefficient of thermal expansion of platform = $\alpha_a$
 $x_f$ = length of flexure
 $x_c$ = distance from the center of the disk to the center of the data zone on the disk.

Thus, all the terms in equation (17) are now completely defined, and selection of the three parameters for the band, the diameter of the capstan, and the materials for the flexure, actuator arm, capstan and bands permits direct calculation of the fourth dimension of band so that the read/write head remains centered over the track for temperature variations. In a preferred embodiment the following dimensions and metals with the following thermal expansion coefficients were used.

$x_f$ = 1.060 inches $x_1$ = 1.818 inches $x_2$ = 1.601 inches $x_c$ = 1.375 inches $w_2$ = 0.240 inches $d$ = 0.431 inches $\alpha_c$ = 13.5 $\mu$ inch/inch/°F., rolled aluminum $\alpha_b$ = 8.4 $\mu$ inch/inch/°F., cold rolled Sandvik 11R51

$\alpha_a$ = 11.5 $\mu$ inch/inch/°F., die cast aluminum $\alpha_f$ = 9.6 $\mu$ inch/inch/°F., stainless steel
$\alpha_d$ = 13.3 $\mu$ inch/inch/°F., rolled aluminum First, these numbers are used to calculate C and $\Delta x$ and then the values for C and $\Delta x$ and are used in equation (17) to calculate $w_1$, wherein $w_1 = 0.18$ inch.

Since this value of $w_1$ is an upper bound on the width of strip 104a, a band 104 with a 0.18 inch strip 104a was built and the band was assembled on the capstan and actuator arm of a disk drive. The band was tensioned, as previously described, so that at the lowest operating temperature for the disk drive, the band transferred the motion of the capstan to the actuator arm. The thermal compensation provided by the 0.18 inch strip was measured. The strip 104a of the band was etched to produce a slightly narrower strip and the thermal compensation measurement repeated. This process was repeated three more times.

Statistical analysis of the thermal compensation test results indicated that a strip having a width of 0.140 inches should provide the correct thermal compensation. The design process was simplified over the prior art because the model, described above, is simpler than the models required for the prior art disk drive and the model provides an accurate upper bound on the thermal expansion so that fewer engineering samples and tests are required to ascertain the correct size for the band.

Since each of the flexures is attached to the actuator arm at a single point, buckling is not a problem, and the thermal compensation for one flexure is the same as the thermal compensation for the other flexures. The uniform method of attaching the flexures also lowers the inertia of the assembled actuator arm over the prior art because the extra plates of the prior art are eliminated. Accordingly, the single component actuator arm and the single point connection between the flexures and the actuator arm enhances the access time and the shock and vibration characteristics also.

While one embodiment of this invention has been disclosed, it should be understood that the present disclosure merely exemplifies the principles of the invention and is not intended to limit the invention to the embodiment illustrated. From the present disclosure, other embodiments and the advantages of this invention will be apparent to one skilled in the art.

What is claimed is:

1. A data storage system comprising:
  means for storing data;
  means for reading and writing data at selected positions on said means for storing data;
  means for positioning said means for reading and writing data at selected positions, said means for positioning having:
  an arm;
  a flexure having two ends, wherein said means for reading and writing data is connected to a first end of said flexure and a second end of said flexure is attached to said arm at a single point;
  a stepper motor having a shaft;
  a capstan mounted on said shaft of said stepper motor; and
  a band having two ends, a first portion and a second portion, wherein:
    said first portion comprises a substantially rectangular strip having a first selected length $x_1$ and a first selected width $w_1$;
    said second portion comprises two parallel substantially rectangular strips each having a second selected length $x_2$ and a second selected width $s$; and
      further wherein the upper limit for said first selected width $w_1$ is determined from the relationship $$w_1 = \frac{2s\, x_1 (\Delta x - 2C)}{x_2 (\Delta x + 2C)}$$

a first end of said band is anchored to a first selected position on said arm;
  a second end of said band is anchored to a second selected position on said arm; and
  said band is secured to said capstan so that as said stepper motor turns said capstan, the motion of said capstan is transferred to said arm; and
  a platform on which said means for storing data, said means for reading and writing, and said means for positioning are operatively mounted; and
  means for compensating for the difference in thermal expansion of said flexure, said arm and said means for storing data so as to reduce displacement of said means for reading and writing relative to said means for storing data caused by changes in temperature wherein said means for compensation of thermal expansion comprises said band, said band having a selected stiffness and a coefficient of thermal expansion such that upon a net expansion per degree Fahrenheit, $\Delta x$, due to thermal expansion of said band, thermal expansion of said arm, and thermal expansion of said capstan, said arm moves a distance, C, said distance C offsetting a displacement of said means for reading and writing relative to said disk caused by thermal expansion of said flexure, said thermal expansion of said arm, and thermal expansion of said platform.

2. A thermal compensation system for use in an open loop stepper actuated disk drive having a hard disk, a read/write head coupled to a flexure, said flexure being coupled to a single point of an actuator arm, a capstan coupled to said arm so that the motion of said capstan is transferred to said arm, and a platform on which said actuator arm and said disk are operatively mounted, said thermal compensation system comprising:
  a band having two ends wherein:
    a first end of said band is anchored to a first selected position on said arm;
    a second end of said band is anchored to a second selected position on said arm;
    said band is secured to said capstan so that as said capstan turns, the motion of said capstan is transferred to said arm; and
    said band has a selected stiffness and a coefficient of thermal expansion such that upon a net expansion per degree Fahrenheit, $\Delta x$, due to thermal expansion of said band, thermal expansion of said arm, and thermal expansion of said capstan, said arm move a distance, C, wherein said distance C offsets a displacement of said means for reading and writing relative to said disk caused by thermal expansion of said flexure, said thermal expansion of said arm, and thermal expansion of said platform;
    wherein said band comprises a first portion and a second portion, and said first portion comprises a substantially rectangular strip having a first selected length $x_1$ and a first selected width $w_1$, and said second portion comprises two parallel substantially rectangular strips each having a second selected length $x_2$ and a second selected width $s$ and further wherein the upper limit for said first selected width $w_1$ is determined from the relationship $$w_1 = \frac{2s\, x_1 (\Delta x - 2C)}{x_2 (\Delta x + 2C)}.$$

* * * * *